United States Patent [19]

Decker et al.

[11] Patent Number: 5,736,196
[45] Date of Patent: Apr. 7, 1998

[54] FLUID CURE OF EPOXY-BASED COATING POWDER

[75] Inventors: Owen H. Decker, Wyomissing; Dieter W. Jungclaus, Lancaster; Karl R. Wursthorn, Mohnton; Glenn D. Correll, Birdsboro, all of Pa.; David A. Mountz, Hattiesburg, Miss.

[73] Assignee: Morton International, Inc., Chicago, Ill.

[21] Appl. No.: 720,826

[22] Filed: Oct. 2, 1996

[51] Int. Cl.$^6$ ........................................ B05D 3/04
[52] U.S. Cl. ........................ 427/341; 427/195; 427/254; 427/376.1; 427/386; 428/413; 525/504; 525/505; 525/506; 525/523; 525/934; 528/90; 528/92; 528/93; 528/112; 528/422
[58] Field of Search ........................ 525/504, 523, 525/934, 505, 506; 528/93, 422, 90, 92, 112; 427/195, 254, 341, 376.1, 386; 428/413

[56] References Cited

U.S. PATENT DOCUMENTS 4,310,645  1/1982  Kempter et al. .................. 525/526

FOREIGN PATENT DOCUMENTS

| 456603 | 9/1993 | European Pat. Off. . |
| 503866 | 11/1993 | European Pat. Off. . |
| WO 9411446 | 7/1994 | European Pat. Off. . |
| 50085632 | 8/1993 | Japan . |
| 63-310504 | 9/1993 | Japan . |

*Primary Examiner*—Randy Gulakowski
*Attorney, Agent, or Firm*—Wayne E. Nacker; Gerald K. White

[57] ABSTRACT

A coating powder based on an epoxy resin is applied to a substrate and fused and cured thereon. Curing is effected by exposing the coating powder at the point of application to a fluid curative or cure catalyst, e.g., by exposing the fusing coating powder to an ammonia-containing atmosphere.

23 Claims, No Drawings

FLUID CURE OF EPOXY-BASED COATING POWDER

The present invention is directed to a novel method of curing coating powders based, at least in part, on an epoxy resin.

BACKGROUND OF THE INVENTION

Powder coating formulations based upon epoxy resins are well known in the art. Most commonly, the epoxy resin is a reaction product of bisphenol A and epichlorohydrin as described, for example, in U.S. Pat. No. 3,177,090, the teachings of which are incorporated herein by reference. Other patents directed to epoxy resin powder coating compositions and/or epoxy resins suitable for use in powder coating compositions are U.S. Pat. Nos. 3,349,060, 3,438,849, 3,211,695 and 3,028,251, the teachings of which are incorporated herein by reference.

Epoxy resin coating compositions are formulated with an appropriate curing agent, such as a dicyandiamide, o-tolyl biguanide, or an imidazole/epoxy resin adduct (such as that sold under the trade designation XU 261 by Ciba Geigy Corporation. Such curing agents tend to be expensive.

Coating powders containing both an epoxy resin and a curative do not have unlimited shelf-life, exhibiting some cure at storage and shipping temperatures.

Aliphatic amines are well-known curatives for epoxy resins. However, they have heretofore not proven useful curatives for epoxy resin-based coating powders because they are too reactive when used in common coating powder preparation methods such as solution blending, dry blending or melt blending.

In solution blending, resins and curing agents are dissolved in a solvent; then the solvent is removed and the solid product crushed to a powder. Aliphatic amines, however, react rapidly with epoxies in solvents which dissolve both the amine and epoxy resin.

In dry blending, solid resin and solid curing agent are ground together at temperatures below the melting point of either component. Dry blending of aliphatic amine curing agents is not an option because at convenient processing temperatures suitable amines are gases, liquids or solids with very low melting temperatures.

In melt blending, resins and curing agents are blended together at temperatures where at least the resin and often both the resin and curing agent are liquids. After blending, the composition is chilled and crushed to a powder. Curing agents are chosen which exhibit minimal reaction with the resin at the blending temperature. After blending, the composition is chilled and crushed to form a powder. Amines tend to be highly reactive at the lowest temperatures at which resins can be melted. Composition curing advances rapidly during melt blending, and cure often continues to advance in the powder state after chilling and grinding.

It is a general object of the invention to utilize aliphatic amines and other fluid curatives and/or cure catalysts to cure epoxy-based coating powders.

SUMMARY OF THE INVENTION

In accordance with the present invention a coating powder is formed which contains an epoxy resin. The epoxy-based coating powder is applied to a substrate and fused thereon. At the point of application, either contemporaneously with application of the coating powder or as the coating powder is fused, the coating powder composition is exposed to a fluid curative or cure catalyst to effect a cure of the epoxy resin. The fluid may be a liquid, but is preferably in vapor phase. Curatives may be ammonia, organic amines, and multifunctional mercaptans. Also, strong acids, such as hydrogen chloride, which act as a catalyst to promote auto cross-linking of the epoxy resin, are suitable.

DETAILED DESCRIPTION OF CERTAIN PREFERRED EMBODIMENTS

The coating powders of the present invention are based upon resins having polyepoxide functionality. Preferably, the resin is a bisphenol epoxy resin, e.g., bisphenol A/epichlorohydrin resins and diglycidal ethers of bisphenol A. However, coating powders based on other known epoxy resins, such as epoxy novolacs, and epoxy functional acrylic resins are also suitable. Epoxy resins having polymeric backbones which could be attacked by the amine, such as glycidyl polyesters, are not preferred. The epoxy resin may be the only resin present in the coating powder or the coating powder may contain up to 75 wt % of another resin or resins. However, other resins which might normally react with the epoxy resin, i.e., which might be considered to be an epoxy curative, are preferably avoided. Epoxy resins useful in coating powders in accordance with the invention have epoxy equivalent weights of between about 400 and about 10,000, preferably between about 500 and about 2,000.

Preferred curatives in accordance with the invention are ammonia and aliphatic amines. To obtain cross-linking of the epoxy resin, at least two active amine sites are required. Ammonia with three active sites is suitable. Also suitable are primary aliphatic amines as well as multi-functional secondary aliphatic amines. Some examples of suitable amines are methyl amine, ethyl amine, benzyl amine, 2-amino ethanol, ethylene diamine, propylene diamine, 2-methyl-1,5-pentanediamine, 2-aminomethyl-2-ethyl-1,3-propanediamine, diethylene triamine, and triethylene tetramine. Two types of amines are preferred. From the standpoint of ease of use, economy, and absence of organic moieties, ammonia is the most preferred curative when the amine is to be applied as a gas, as in Examples 1 and 2 below. When the amine is to be applied as a liquid, preferred amines are at least difunctional (e.g., have two or more amino groups). In addition, the amino groups are primary, and the amine compound is liquid at both room temperature and at the cure temperature of interest. A preferred example of such an amine is 2-methyl-1,5-pentanediamine.

While the use of multifunctional mercaptans, such as butyl dimercaptan, as curatives are considered within the scope of the invention, their odor generally counter-indicates their use.

Vapor phase acid cure catalysts suitable for effecting auto cure include HCl, $CF_3CH_2OH$, $CF_3CO_2H$, $BF_3$, $BCl_3$ and the like.

Liquid phase acid catalysts suitable for effecting cure are aqueous solutions such as 30% aqueous HCl and 33% aqueous p-toluenesulfonic acid.

The coating powder may be unfilled or filled, i.e., containing up to about 70 wt % pigments and fillers. Other known components of coating powders such as flow aids, degassing aids, antioxidants and stabilizers may also be included.

Exposure to the curative or cure catalyst may be effected along with application of the curing powder, e.g., powder may be applied to a substrate to which curative has already been applied, or by spraying atomized curative or cure catalyst as the powder is being applied to the substrate, e.g., by electrostatic spraying. Alternatively, the coating powder composition may be exposed to the curative or cure catalyst any time during fusion, e.g. as fusion commences or even after the coating powder has fully fused onto the substrate. Such exposure may be exposing the coated substrate to an atmosphere containing the curative or by spraying a liquid curative or cure catalyst onto the fusing coating powder composition.

Of the variations in application methods in accordance with the invention, it is preferred to expose the coated substrate to the curative or cure catalyst after film formation (fusion) has begun and preferably after the film has formed. It is found that Orange Peel is reduced when curing follows film-formation.

The advantages of the present invention are most fully realized in coating powders containing no epoxy curative or epoxy cure catalyst other than that provided in fluid form at the point of application. However, the method of the present invention may be used to hasten the curing of coating powders containing internal curatives and/or cure catalysts.

The coating powder may be prepared in a conventional manner, such as solution blending or melt blending, as described above.

One advantage of the present invention is that the coating powders, particularly those with no internal curative or cure catalyst, useful in the practice of the invention may be prepared by non-conventional methods of preparing coating powders. Many critical properties of powder coatings, such as coating thickness, chargeability, fluidizing bed pressures, build thickness, percent overspray, etc., are determined by the shape, size and size distribution of the coating powder particles. Conventional art for preparing coating powders has limited control of these parameters, particularly particle shape, because powders are generally prepared by grinding of solid compositions. The present invention allows for techniques, such as spray drying of a solution of coating powder composition or spray congealing of an atomized coating powder composition, which techniques provide spherical particles of controlled size and narrow size distributions. These techniques are particularly suitable for preparing unfilled coating powders. Controlled size, uniform size and spherical shape contribute to higher transfer of powder to the substrate and, particularly in thin coatings, i.e., about a micron or less, smoother film.

It is not practical to precisely define the amount of curative or cure catalyst that is added relative to the amount of epoxy resin in the coating powder. Proper exposure of the coating powder composition depends upon a number of factors, such as time, temperature, coating powder composition, the particular curative or cure catalyst used, particle size and size distribution, particle shape, method of application, e.g., along with the powder or during fusion, and concentration of curative or cure catalyst, e.g., partial pressure of curative in a curing atmosphere. Accordingly, for each coating powder, appropriate curing conditions are determined empirically.

A significant advantage afforded by the method of the present invention is that coating powders containing no curative or cure catalysts may be used. Such a coating powder without either internal curative or catalyst has very long-term shelf-life, provided the coating powder is not exposed to elevated temperatures whereat auto cross-linking of the epoxy resin would occur. Thus coating powders with effectively infinite shelf-life can be produced and the curative or cure catalyst applied only at the point of application.

Curatives, such as ammonia, simple organic amines, and mercaptans are inexpensive, particularly relative to curatives conventionally used in epoxy coating powders. Likewise, acid cure catalysts are inexpensive.

The curatives and cure catalysts useful in this invention are highly reactive, allowing curing at temperatures as low as about 165° F. (74° C.). At higher cure temperatures, curing is rapid, similar to conventionally prepared powder coatings.

The invention will now be described in greater detail by way of specific example.

The following reagents were used in examples 1 and 2.

Ammonia—Curing Agent, MG Industries

Araldite® GT-7072—Resin derived from Bisphenol A/Epichlorohydrin, equivalent wt./500–700, Ciba Geigy Araldite® 61-7071—See GT-7072, equivalent wt./500–600

Troy®EX-486—Flow aid, Troy Chemical

Uraflow®B—Benzoin degassing aid, GCA Chemical

EXAMPLE 1

Coating powder was prepared by standard procedure of dry blending raw materials, extruding grinding and sieving. Formulation and processing are listed in Table 1 below:

TABLE 1

| COMPOSITION of 261-11-1 Coating Powder | |
|---|---|
| Component | phr (parts per hundred resin by wt.) |
| GT-7072 | 100 |
| Troy EX 486 | 1.5 |
| Uraflow B | 0.8 |

| PROCESSING | |
|---|---|
| Extruder | Buss |
| Temperature | 180° F. (82° C.) |
| Screen Mesh | –100 |

The powder was coated by electrostatic spray gun onto 0.032" (0.81 mm) thick "Q" panels of zinc phosphate-treated steel. The coated panels were placed in a vacuum oven which had been pre-heated to 165° F. (74° C.). A vacuum of 28.5 in (724 mm) Hg was drawn and the pressure in the oven was returned to atmospheric by addition of ammonia gas which had been preheated to 165° F. Panels were allowed to remain in the oven for 60 minutes, then removed and allowed to cool in air to room temperature. Properties of the panels were tested at room temperature and are listed in Table 2 below:

TABLE 2

| Coating Thickness (mils) | 1.1–1.4 |
|---|---|
| Impact Resistance (Direct/Reverse) | 160/160 |
| 1/8" Mandrel Bend | Pass |
| Pencil Hardness | F/H |
| MEK Resistance | slight softening |

EXAMPLE 2

This example illustrates a gaseous ammonia cure of an epoxy coating powder on a wood substrate.

A 3"×6"×½" birch veneer plywood block was preheated for 30 minutes in a 200° F. oven then submerged in a fluid bed containing the powdered composition 261-11-1. The block was placed in a vacuum oven at 200° F., and a vacuum of 28 inches of Hg was drawn. The oven was then filled with ammonia preheated to 200° F. at atmospheric pressure, and allowed to cure for 75 minutes.

After the cure, the block was removed from the oven and allowed to cool. Surface imperfections were removed by sanding with 400 grit sandpaper. The block was pre-heated 15 minutes in a 200° F. oven, dipped in a fluid bed, then placed in vacuum oven at 200° F. A vacuum of 28 inches of Hg was drawn. The oven was filled with ammonia preheated to 200° F., and allowed to cure for 75 minutes.

The block was removed from the oven and observed to have a clear coating with 2–4 minor bubble defects per side. Thickness was 6–9 mils. The coating was unaffected by MEK after 50 double rubs.

EXAMPLE 3

This example shows the dependence of coating properties on the length of time the coating is exposed to the curative.

Coating powder 250-92-3 was prepared by the standard procedure of dry-blending raw materials, extruding, grinding, and sieving. The formulation and processing are listed in Table 2 below.

TABLE 2

| COMPOSITION | |
| --- | --- |
| COMPONENT | phr |
| GT-7071 | 50 |
| GT-7072 | 50 |
| Troy EX-486 | 1.5 |
| Uraflow B | 0.8 |
| PROCESSING | |
| Extruder | Buss |
| Temperature | 180° F. |
| Screen Mesh | −100 |

The powder was coated by electrostatic spray gun onto 0.032" (0.81 mm) thick "Q" panels of zinc phosphate-treated steel. The coated panels were placed in a vacuum oven which had been preheated to 195° F. (74° C.). A vacuum of 28.5 in Hg (725 mm Hg) was drawn and the pressure in the oven was returned to atmospheric by addition of ammonia gas which had been preheated to 195° F. Panels were allowed to remain in the oven for the varying times listed in Table 3, then removed and allowed to cool in air to room temperature. Properties of the coatings were tested at room temperature on panels which had coating thickness of 1.8 to 2.2 mils and are listed in Table 3.

TABLE 3

| Example | Ammonia Exposure (minutes) | Impact Resistance (direct/re. inch-lbs) | 1/8" Mandrel Bend | MEK Resistance |
| --- | --- | --- | --- | --- |
| 3a | 20 | fail/fail | fail | 1 (rub through) |
| 3b | 30 | fail/fail | fail | 3 (minor rub-off) |
| 3c | 38 | 60/80 | pass | 4 (softening) |
| 3d | 60 | 160/160 | pass | 5 (no effect) |

EXAMPLES 4–11

These examples illustrate some of the breath of curing agents which can be applied to a powder coated part as fluids at the time of cure.

Coating powder 352-71 was prepared by the standard procedure of dry-blending raw materials, extruding, grinding, and sieving. The formulation and processing are listed in Table 5 below.

TABLE 5

| COMPOSITION | |
| --- | --- |
| COMPONENT | phr |
| GT-7013 | 100 |
| Bartex 65 | 20 |
| Troy EX-486 | 1.5 |
| Uraflow B | 0.8 |
| PROCESSING | |
| Extruder | Baker Perkins |
| Temperature | 180° F. |
| Screen Mesh | −100 |

Sections of particle board (urea/formaldehyde-bonded wood particles) of dimensions 4"×4"×¾" were sprayed with the amine or acid listed in Table 5 and allowed to stand for five minutes. The samples were coated in horizontal position by electrostatic spray gun with powder 352-71. They were then placed in a 200° F. air circulating oven and held for 30 minutes. The identities of the various curing agents and the properties of the resulting coatings appear in Table 6.

TABLE 6

Properties of Coatings from Examples 4–11

| Example | Curing Agent (Identity) | Curing Agent (g) | MEK Resistance | Impact Appearance | Gloss 60° |
| --- | --- | --- | --- | --- | --- |
| 4 | None | — | Rub through | Crazing | 20–30 |
| 5 | 33% Toluene Sulfonic Acid | 1.8 | Heavy rub off | Circular Delamination | 3–5 |
| 6 | Triethylene Tetramine | 3–4 | Light rub off | No damage | 0–1 |
| 7 | 70% Ethyl Amine | 3.4 | Rub through | Crazing | 15–20 |
| 8 | 30% Ammonium Hydroxide | 10 | Rub through | Crazing | 75–80 |
| 9 | 3% HCl | 2.3 | Rub through | Circular Cracking | 20–30 |
| 10 | Butyl Amine | 2.3 | Rub through | Crazing | 70–75 |
| 11 | 2-Methyl-1,5-Pentanediamine | 3.5 | Softening | Minor Circular Cracking | 9–10 |

What is claimed is:

1. In a method of forming a coating on a substrate comprising providing a coating powder formed of a composition comprising an epoxy resin, applying the coating powder to said substrate, and fusing and curing said coating powder on said substrate, the improvement wherein curing is effected by exposing the coating powder composition to a separate fluid curative or fluid cure catalyst selected from the group consisting of ammonia, multi-functional mercaptans, aliphatic amines, HCl and Lewis acids contemporaneously with application of said coating powder to said substrate or subsequent to application of said coating powder to said substrate.

2. A method according to claim 1 wherein said curative is ammonia.

3. A method according to claim 1 wherein said curative is an aliphatic amine.

4. A method according to claim 1 wherein said curative is a multifunctional mercaptan.

5. A method according to claim 1 wherein said cure catalyst is a Lewis acid.

6. A method according to claim 1 wherein said coating powder composition is exposed to fluid in liquid phase.

7. A method according to claim 1 wherein said coating powder composition is exposed during or after fusion to an atmosphere containing said curative or cure catalyst.

8. A method according to claim 7 wherein said curative is ammonia.

9. A method according to claim 7 wherein said curative is an aliphatic amine.

10. A method according to claim 7 wherein said curative is a multifunctional mercaptan.

11. A method according to claim 7 wherein said cure catalyst is a Lewis acid.

12. A method according to claim 1 wherein said coating powder composition, aside from said fluid curative or fluid cure catalyst, contains no curative for said epoxy resin and no cure catalyst for said epoxy resin.

13. A method according to claim 1 wherein said substrate is wood.

14. A method according to claim 1 wherein said cure catalyst is HCl.

15. A method according to claim 7 wherein said cure catalyst is HCl.

16. In a method of forming a coating on a substrate comprising providing a coating powder formed of a composition comprising an epoxy resin, applying the coating powder to said substrate, and fusing and curing said coating powder on said substrate, the improvement wherein curing is effected by exposing the coating powder composition to a fluid curative or fluid cure catalyst in the vapor phase selected from the group consisting of ammonia, multifunctional mercaptans, aliphatic amines, HCl and Lewis acids contemporaneously with application of said coating powder to said substrate or subsequent to application of said coating powder to said substrate.

17. A method according to claim 16 wherein said curative is ammonia.

18. A method according to claim 16 wherein said curative is an aliphatic amine.

19. A method according to claim 16 wherein said curative is a multi-functional mercaptan.

20. A method according to claim 16 wherein said curative is a Lewis acid.

21. A method according to claim 16 wherein said curative is HCl.

22. A method according to claim 16 wherein said coating powder composition, aside from said fluid curative or fluid cure catalyst in vapor phase, contains no curative for said epoxy resin and no cure catalyst for said epoxy resin.

23. A method according to claim 16 wherein said substrate is wood.

* * * * *